(12) United States Patent
Meid et al.

(10) Patent No.: US 11,971,095 B2
(45) Date of Patent: Apr. 30, 2024

(54) HYDRAULIC ARRANGEMENT AND AGRICULTURAL OR INDUSTRIAL UTILITY VEHICLE

(71) Applicant: DEERE & COMPANY, Moline, IL (US)

(72) Inventors: Michael Meid, Waghaeusel (DE); Manuel Billich, Dischingen (DE); Thomas Busold, Bruehl (DE)

(73) Assignee: DEERE & COMPANY, Moline, IL (US)

( * ) Notice: Subject to any disclaimer, the term of this patent is extended or adjusted under 35 U.S.C. 154(b) by 59 days.

(21) Appl. No.: 17/811,711

(22) Filed: Jul. 11, 2022

(65) Prior Publication Data
US 2023/0045588 A1 Feb. 9, 2023

(30) Foreign Application Priority Data
Aug. 4, 2021 (DE) .......................... 102021120313.9

(51) Int. Cl.
*F16H 57/04* (2010.01)
*F16H 61/00* (2006.01)

(52) U.S. Cl.
CPC ..... *F16H 57/0435* (2013.01); *F16H 57/0436* (2013.01); *F16H 61/0021* (2013.01); *F16H 2061/0037* (2013.01)

(58) Field of Classification Search
CPC ......... F16H 61/0021; F16H 2061/0037; F16H 57/0435; F16H 57/0436; F16H 57/0441
See application file for complete search history.

(56) References Cited

U.S. PATENT DOCUMENTS

| | | | | |
|---|---|---|---|---|
| 5,020,324 A | * | 6/1991 | MacDonald | .......... F04B 49/007 417/252 |
| 5,906,556 A | * | 5/1999 | Harada | ................. F16H 61/143 475/120 |
| 6,371,158 B1 | * | 4/2002 | Hou | ......................... F15B 1/26 137/561 A |
| 7,954,317 B2 | | 6/2011 | Bitter et al. | |
| 9,671,009 B2 | | 6/2017 | Nystrom et al. | |
| 2016/0069447 A1 | * | 3/2016 | Filippin | .............. F16H 57/0446 60/459 |

FOREIGN PATENT DOCUMENTS

| | | |
|---|---|---|
| EP | 1923606 A2 | 5/2008 |
| EP | 2667039 A2 | 11/2013 |

OTHER PUBLICATIONS

European Search Report issued in European Patent Application No. 22185670.1, dated Dec. 7, 2022, 07 pages.

* cited by examiner

*Primary Examiner* — Jake Cook (57) ABSTRACT

A hydraulic arrangement for an agricultural or industrial utility vehicle includes a main hydraulic circuit, a main hydraulic pump, a charge pump, a lubricating hydraulic circuit, a gearbox lubricating hydraulic circuit, a shifting hydraulic circuit, and a gearbox pump. Hydraulic fluid can be fed to the main hydraulic circuit by the main hydraulic pump. Hydraulic fluid can be fed to the main hydraulic pump by the charge pump. At least a part of the hydraulic fluid delivered by the charge pump can be fed to the lubricating hydraulic circuit. Hydraulic fluid can be fed to the shifting hydraulic circuit by the gearbox pump. At least a portion of the hydraulic fluid delivered by the charge pump can be fed to the gearbox lubricating hydraulic circuit.

20 Claims, 5 Drawing Sheets

HYDRAULIC ARRANGEMENT AND AGRICULTURAL OR INDUSTRIAL UTILITY VEHICLE

CROSS-REFERENCE TO RELATED APPLICATIONS

This application claims priority to German Patent Application No. 102021120313.9, filed on Aug. 4, 2021, which is hereby incorporated by reference.

FIELD OF THE DISCLOSURE

The disclosure relates to a hydraulic arrangement for an agricultural or industrial utility vehicle.

BACKGROUND

Agricultural or industrial utility vehicles can have a hydraulic system with one or more hydraulic circuits.

SUMMARY

In agricultural or industrial utility vehicles, for example agricultural or industrial towing vehicles, such as tractors, it is conventional for the hydraulic components provided on the machine or on the utility vehicle to be supplied by separate hydraulic circuits or hydraulic branches. For example, the hydraulic arrangement for an agricultural or industrial utility vehicle can comprise a main hydraulic branch, which is able to be supplied with hydraulic fluid by a main hydraulic pump, and a charge pump, using which the main hydraulic pump is able to be supplied and/or fed and/or charged with hydraulic fluid. Furthermore, the hydraulic arrangement may comprise a gearbox hydraulic branch and also a lubricating hydraulic branch and/or a charge hydraulic branch. Depending on the type of construction, the main hydraulic branch can be subdivided into further different branches in order to supply the steering, brakes and other hydraulic components with hydraulic fluid.

In the case of the gearbox hydraulic branch, it is also possible for this to comprise the shifting hydraulic branch and/or the gearbox lubricating hydraulic branch. The shifting hydraulic branch can ensure the function of the gearbox for example, the operation of clutches in a gearbox and/or the function of the individual clutches. The gearbox lubricating hydraulic branch can ensure the lubrication and/or cooling of the bearings and other moving gearbox parts. To supply the gearbox hydraulic branch, a gearbox pump can be used, for example a cost-effective simple fixed displacement pump or a variable displacement pump. As a rule, the gearbox lubricating hydraulic branch can then be supplied via the gearbox pump. The charge pump can serve, for example via the charge hydraulic branch, to supply the main hydraulic branch with hydraulic fluid. The charge hydraulic branch can operate for example in a pressure range from 1 bar to 2 bar. The shifting hydraulic circuit can operate for example between 15 bar and 25 bar, for example on account of the dependence on the required torque capacity. The gearbox lubricating hydraulic branch can operate for example in the range from 0.5 bar to 2 bar.

Known hydraulic arrangements and/or utility vehicles have the drawback that the gearbox pump is oversized in order to provide enough hydraulic fluid during shifting operations, to the shifting hydraulic branch, with simultaneous gearbox lubrication, to the gearbox lubricating hydraulic branch. A further drawback is the lack of energy efficiency. The entire quantity to be delivered by the gearbox pump has to be compressed to a system pressure. This has the result, on account of the direct correlation of pressure and flow rate, that the gearbox pump has to exhibit or produce a high pump output. Since, however, the shifting hydraulic branch requires a low flow rate and high pressure and the gearbox lubricating hydraulic branch requires a high flow rate and low pressure in phases without clutch/brake actuations, the hydraulic arrangement, for example the gearbox hydraulic branch, thus exhibits low or poor efficiency. Furthermore, on account of the valve characteristics, dependence on system pressure and motor speed exists in the gearbox hydraulic branch. The additionally generated system pressure is disadvantageously not required, however. Moreover, during shifting, a low flow rate can be provided for clutch and brake cooling, since the entire pump flow rate is required on account of clutch and brake filling having priority, i.e., for the shifting hydraulic branch. This is the case for example with lower motor speeds. Likewise, the thermal energy that is additionally generated on account of the oversizing and the additional power expenditure of the gearbox pump is distributed in the gearbox. This thermal energy has to be cooled by the gearbox cooler and dissipated. As a whole, unnecessary power losses disadvantageously arise in the hydraulic arrangement and/or throughout the utility vehicle.

Therefore, the present disclosure is based on the object of proposing a hydraulic arrangement and a utility vehicle with which the abovementioned problems are overcome. For example, a hydraulic arrangement and a utility vehicle are intended to be proposed, with which the abovementioned power losses can be reduced or the hydraulic arrangement and/or the utility vehicle can be operated more efficiently and/or can be configured with a simpler design and/or can be operated more easily.

This object is achieved by a hydraulic arrangement having the features of the one or more independent claims. The dependent claims relate to additional advantageous embodiments of the disclosure.

According to the disclosure, a hydraulic arrangement for an agricultural or industrial utility vehicle is proposed. The hydraulic arrangement comprises a main hydraulic branch and a main hydraulic pump, wherein hydraulic fluid is able to be fed to the main hydraulic branch by the main hydraulic pump. In other words, the main hydraulic branch can be able to be charged or supplied or fed with hydraulic fluid for example by the main hydraulic pump. The hydraulic fluid can be able to be fed to the main hydraulic branch by the main hydraulic pump at a first pressure or under a first pressure. The first pressure may be in a range from 30 bar to 210 bar. The hydraulic arrangement also comprises a charge pump, wherein hydraulic fluid is able to be fed to the main hydraulic pump by the charge pump. In other words, the main hydraulic pump can be able to be charged or supplied or fed with hydraulic fluid for example by the charge pump. The hydraulic fluid can be able to be fed to the main hydraulic pump by the charge pump at a second pressure or under a second pressure. The hydraulic arrangement furthermore comprises a lubricating hydraulic branch and a gearbox lubricating hydraulic branch, wherein at least a part of the hydraulic fluid delivered by the charge pump is able to be fed to the lubricating hydraulic branch. In other words, the lubricating hydraulic branch can be able to be charged or supplied or fed with hydraulic fluid for example by the charge pump. The hydraulic fluid can be able to be fed to the lubricating hydraulic pump by the charge pump at the second pressure or under the second pressure. The second pressure can be for example in a range from 1 to 2 bar. Furthermore, the hydraulic arrangement comprises a shifting hydraulic branch for shifting a gearbox, for example for operating clutches in a gearbox, and a gearbox pump, wherein hydraulic fluid is able to be fed to the shifting hydraulic branch by the gearbox pump. In other words, the shifting hydraulic branch can be able to be charged or supplied or fed with hydraulic fluid for example by the gearbox pump. The hydraulic fluid can be able to be fed to the shifting hydraulic branch by the gearbox pump at a third pressure or under a third pressure. The third pressure can be for example in a range from 15 to 25 bar. At least a part of the hydraulic fluid delivered by the charge pump, and for example the gearbox pump, is able to be fed to the gearbox lubricating hydraulic branch. In other words, the gearbox lubricating hydraulic branch can be able to be supplied or fed for example with at least a part of the hydraulic fluid delivered by the charge pump or a part of the hydraulic fluid can be able to be branched off from the charge pump. The hydraulic fluid can be able to be fed to the gearbox lubricating hydraulic branch by the charge pump at the second pressure or under the second pressure. The gearbox lubricating hydraulic branch itself can operate for example in a pressure range from 0.5 to 2 bar.

In the main hydraulic branches, to avoid power losses, the main hydraulic pumps can be in the form of variable displacement pumps with a load-sensing hydraulic system. These variable displacement pumps as a rule have a limited intake capacity, however, for which reason charge pumps can be used, which feed hydraulic fluid to the main hydraulic pump, for example the variable displacement pump, for example at the second pressure or under the second pressure. The charge pump can be in the form of a fixed displacement pump or of a variable displacement pump. Both types of pumps have good intake properties, and so a sufficient intake pressure is ensured even when used in cold environments.

The charge pump can thus supply both the main hydraulic pump and the lubricating hydraulic branch of the hydraulic arrangement or of the utility vehicle with the quantity of hydraulic fluid that is required in each case. To this end, the hydraulic arrangement can comprise a charge hydraulic branch, wherein hydraulic fluid is able to be fed to the charge hydraulic branch by the charge pump. The charge hydraulic branch can comprise the lines between the charge pump and the lubricating hydraulic branch and/or the main hydraulic pump and/or the gearbox lubricating hydraulic branch and/or for example the first valve unit. The charge pump can be regulated as a variable displacement pump such that a particular charge pressure, for example the second pressure, is always established in the charge hydraulic branch, this pressure being maintained by the charge pump by varying the delivery volume. When the charge pump is embodied as a fixed displacement pump, a pressure regulating valve can take on the function of pressure regulation.

The main hydraulic pump can be connected to the charge pump and/or for example the charge hydraulic branch. The hydraulic arrangement can be configured in such a way that, as soon as the main hydraulic pump increases its delivery quantity, and thus its displacement, the pressure in the charge hydraulic branch readily collapses and the charge pump embodied as a variable displacement pump increases its delivery volume in order to re-establish the previously set charge pressure. When the charge pump is embodied as a fixed displacement pump, a pressure regulating valve can take on this function.

The hydraulic branches and pumps can be connected, for example fluidically connected, by or via lines or connecting lines. Specifically, the main hydraulic pump and the main hydraulic branch can be connected, for example fluidically connected, together by or via lines and/or valves. Likewise, the charge pump and the main hydraulic pump and/or the lubricating hydraulic branch and/or the gearbox lubricating hydraulic branch can be connected, for example fluidically connected, together by or via lines and/or valves. Furthermore, the gearbox pump and the shifting hydraulic circuit can be connected, for example fluidically connected, together by or via lines and/or valves. The term fluidically connected can be understood as meaning that hydraulic fluid can flow from one of the pumps and/or one of the hydraulic branches into or to another pump and/or another hydraulic branch of the hydraulic arrangement or vice versa. The fluidic connection can be able to be established via the lines or connecting lines.

The hydraulic circuits or hydraulic branches and pumps can be connected together in such a way that the hydraulic fluid can flow, for example under pressure, from one hydraulic branch or a pump into the other hydraulic branch. To this end, the two hydraulic branches or a pump and a hydraulic branch can be connected directly together, for example by lines, or be connected indirectly together, for example by valves.

The lubricating hydraulic branch can be arranged and connected, for example fluidically connected, to the charge pump, and/or for example to the charge hydraulic circuit, such that hydraulic fluid is able to be fed to the lubricating hydraulic branch by the charge pump, for example via the charge hydraulic branch, for example via a second pressure regulating valve. In other words, hydraulic fluid can flow and/or run into the lubricating hydraulic branch from the charge pump, for example via the charge hydraulic branch. As a result, the lubricating hydraulic branch can advantageously be supplied with a quantity of hydraulic fluid that is constant over the entire motor speed range. The second pressure regulating valve can be set, taking into consideration the pressure losses in the lines, for example lubricating fluid lines, such that its opening pressure is below the set charge pressure of the charge pump depending on the required quantity of hydraulic fluid or lubricating fluid. Thus, a constant volumetric flow of hydraulic fluid for lubrication can flow off, since it is desirable for the charge pump, embodied as a variable displacement pump, to compensate for the quantity of hydraulic fluid flowing off by maintaining the previously set charge pressure, and for example since the pressure gradient between the charge hydraulic branch and lubricating hydraulic branch remains constant. When the charge pump is embodied as a fixed displacement pump, a pressure regulating valve can take on this function.

The shifting hydraulic branch can be provided for operating clutches in a gearbox with the gearbox pump, for example a fixed displacement pump or a variable displacement pump. The shifting hydraulic branch can be supplied with hydraulic fluid by the gearbox pump. As a result, the shifting hydraulic branch can be operated independently of the main hydraulic branch.

In some embodiments, the gearbox lubricating hydraulic branch is coupled to the charge pump, and/or for example to the charge hydraulic branch. The coupling can take place for example in combination with a reduction in the delivery volume of the gearbox pump and an increase in the delivery volume of the charge pump. In some embodiments, the charge pump, and for example the charge hydraulic branch, already operates with the pressure required for gearbox lubrication, and so the gearbox pump does not need to be designed to be too large, or can for example be designed to be smaller, and nor does the charge pump need to be designed to be larger. Furthermore, the flow rate through the charge pump is already relatively high on account of the requirement of the main hydraulic branch, meaning that the percentage increase in the pump size for the charge pump is much lower than the percentage decrease in the delivery quantity of the gearbox pump. In some embodiments, the hydraulic arrangement can thus be operated more efficiently, for example more energy efficiently, and easily, since the delivery quantities of the pumps can be adapted to the specific required system pressures and flow rates. Furthermore, the energy efficiency of the charge pump increases with greater capacity, for example in the case of charge pumps with a variable delivery volume. Likewise, it is advantageously possible for higher flow rates to be provided in the case of lower motor speeds. The gearbox lubricating hydraulic branch is advantageously less dependent on the shifting hydraulic branch on account of being coupled to the charge pump, and/or for example to the charge hydraulic branch. As a result, the gearbox lubricating hydraulic branch will be influenced less by the filling of clutch and brakes with hydraulic fluid. Likewise, the cooling can be designed to be smaller, or cooling can be affected with a smaller power requirement. The higher PTO shaft output and/or traction power of the hydraulic system or of the utility vehicle is likewise advantageous. This advantageously results in a structurally simpler configuration of the hydraulic arrangement and for example of the utility vehicle.

In a configuration of the disclosure, the hydraulic arrangement comprises a first valve unit which has an inlet connected, for example fluidically connected, to the charge pump, and/or for example to the charge hydraulic branch, and an outlet connected, for example fluidically connected, to the gearbox lubricating hydraulic branch. The first valve unit is actuable to control the connection, for example to control a fluidic connection, between the charge pump, and/or for example the charge hydraulic branch, and the gearbox lubricating hydraulic branch. In other words, the first valve unit can be configured in such a way that the supply of the gearbox lubricating hydraulic branch with hydraulic fluid is adjustable and/or settable by the charge pump, and/or for example the charge hydraulic branch, for example depending on the charge pressure of the charge pump, i.e., for example the second pressure. Besides the abovementioned advantages of the hydraulic arrangement, a demand-based supply of the gearbox lubricating hydraulic branch can advantageously be realized with the first valve unit.

In one configuration of the disclosure, the first valve unit comprises a first pressure regulating valve. The first pressure regulating valve can be a 2/2-way proportional valve, such as a pressure-actuated 2/2-way proportional valve. The first pressure regulating valve can for example be a control valve. The first valve unit comprises for example a first pilot valve, for example a 3/2-way valve, such as an electrically actuated 3/2-way valve. The first pilot valve can be in the form of a valve for regulating the pressure. The first valve unit, for example the first pressure regulating valve, can be in the form of an electrically regulated pilot-controlled first pressure regulating valve or of a mechanically actuated first pressure regulating valve. However, the first valve unit, for example the first pressure regulating valve, can also be in the form of a directly electronically controlled first pressure regulating valve. The first pressure regulating valve can be spring-loaded. The first valve unit may, however, also comprise a non-return valve with or without spring loading. An outlet of the first pressure regulating valve can be connected, i.e., for example fluidically connected, to the gearbox lubricating hydraulic branch. An inlet of the first pressure regulating valve can be connected, for example fluidically connected, to the charge hydraulic branch and/or to the charge pump. An outlet of the first pilot valve can be connected, i.e., for example fluidically connected, to the first pressure regulating valve, for example with or by a first control line. In the first control line, a throttle or a throttle valve can be arranged. A first inlet of the first pilot valve can be connected, for example fluidically connected, to the charge hydraulic branch and/or to the charge pump. A second inlet of the first pilot valve can be connected, for example fluidically connected, to a hydraulic tank. The first pressure regulating valve can be pressure-actuated by the first pilot valve. The first pressure regulating valve can be preloaded by a spring into a first position in which the outlet and the inlet of the first pressure regulating valve are closed. The first pilot valve can be preloaded by a spring into a first position in which the hydraulic fluid can flow off out of the first control line from the first pressure regulating valve, via the outlet of the first pilot valve, to the second inlet of the first pilot valve and into the hydraulic tank. At the same time, the first inlet of the first pilot valve can be closed. The first pilot valve can be electrically actuated. The first pilot valve can be electrically actuated in such a way that the first pilot valve is movable into a second position. The first pressure regulating valve can be actuated with the first pilot valve in the second position in such a way that the first pressure regulating valve is movable into a second position by means of pressurized hydraulic fluid flowing from the first pilot valve to the first pressure regulating valve. In the second position of the first pilot valve, the first inlet of the first pilot valve can be connected, for example fluidically connected, to the charge hydraulic branch and/or the charge pump and the outlet of the first pilot valve can be connected, for example fluidically connected to the first control line. The second inlet of the first pilot valve can be closed in the second position of the pilot valve. In the second position of the first pressure regulating valve, the outlet of the first pressure regulating valve can be connected to the gearbox lubricating hydraulic branch. At the same time, in the second position of the first pressure regulating valve, the inlet of the first pressure regulating valve can be connected to the charge hydraulic branch and/or to the charge pump. In the second position of the first pressure regulating valve, hydraulic fluid can flow or run in a targeted manner and as required from the charge hydraulic branch and/or the charge pump into the gearbox lubricating hydraulic branch. As a result, the gearbox lubricating hydraulic branch can advantageously be supplied with a required quantity of hydraulic fluid over the entire motor speed range. In some embodiments, the gearbox can thus be lubricated as required by way of the first valve unit. Furthermore, a lower flow rate can be achieved by the first pressure regulating valve, this resulting for example in the system pressure being less dependent on the motor speed.

In one configuration of the disclosure, at least a part of the hydraulic fluid delivered by the main hydraulic pump is able to be fed to the shifting hydraulic branch. This results in additional load relief at the gearbox pump.

For example, the hydraulic arrangement comprises a second valve unit. The second valve unit can have an inlet connected, for example fluidically connected, to the gearbox pump and/or to the shifting hydraulic branch, and an outlet connected, for example fluidically connected, to the gearbox lubricating hydraulic branch. The second valve unit can be actuable to control the connection, for example to control the fluidic connection, between the gearbox pump and/or the shifting hydraulic branch and the gearbox lubricating hydraulic branch. In other words, the second valve unit can be configured in such a way that the supply of the gearbox lubricating hydraulic branch with hydraulic fluid from the gearbox pump is adjustable and/or settable. A part of the hydraulic fluid delivered by the gearbox pump can thus be branched off for the gearbox lubricating hydraulic branch. The unrequired hydraulic fluid of the shifting hydraulic branch can be throttled down to support the gearbox lubricating hydraulic branch and/or fed to the gearbox lubricating hydraulic branch. The second valve unit can comprise for example a pressure relief valve or a simple overpressure valve. A part of the hydraulic fluid can thus be conducted from the gearbox pump via one or more coolers or gearbox coolers into the gearbox lubricating hydraulic branch. The shifting hydraulic branch can thus be operated independently of the main hydraulic branch. Besides the abovementioned advantages of the hydraulic arrangement, an additional supply of the gearbox lubricating hydraulic branch can advantageously be realized with the second valve unit in order to reduce power losses.

In one configuration of the disclosure, the gearbox lubricating hydraulic branch encompasses lubrication of a gearbox and/or of gearbox components with hydraulic fluid. The gearbox lubricating hydraulic branch is for example used for lubricating a gearbox and/or gearbox components, or can be provided for this purpose.

In one configuration of the disclosure, the lubricating hydraulic branch encompasses lubrication of a drive axle, for example of a rear drive axle of the utility vehicle, and/or of vehicle axle components, for example an axle drive, and/or of a PTO shaft and/or of PTO shaft components and/or of a differential with hydraulic fluid. The lubricating hydraulic branch can thus be used for lubricating other low-pressure-lubricated components, for example the drive axle of the utility vehicle and/or the vehicle axle components and/or the PTO shaft and/or PTO shaft components and/or the differential, with hydraulic fluid, or can be provided for this purpose.

The main hydraulic branch for example encompasses supplying, for example hydraulically supplying, control valves with hydraulic fluid and/or a hydraulic hitch, for example a three-point hitch, with hydraulic fluid. The control valves can be provided for supplying other hydraulic components on the utility vehicle, for example accessory equipment, front loaders, etc. The hydraulic components provided at the hitch can be operated by the hydraulic fluid provided in the main hydraulic branch, and for example also the lifting cylinders on the links of the hitch. Likewise, the main hydraulic branch can encompass supplying, for example hydraulically supplying, an axle suspension for a drive axle of the utility vehicle and/or a cab suspension for a cab of the utility vehicle with hydraulic fluid. However, the main hydraulic branch can also encompass supplying, for example hydraulically supplying, a brake system for brakes on the utility vehicle and/or a steering system for steering the utility vehicle with hydraulic fluid. In the event that a separate steering hydraulic branch with an electric pump is not provided, the main hydraulic branch can also be provided for hydraulically supplying a steering system for steering the utility vehicle.

The disclosure also relates to an agricultural or industrial utility vehicle, for example a tractor or a construction vehicle. The agricultural or industrial utility vehicle comprises a hydraulic arrangement, for example a hydraulic arrangement according to one of the embodiments disclosed herein. The utility vehicle according to the disclosure has the above-described advantages of the hydraulic arrangement according to the disclosure. The agricultural or industrial utility vehicle can comprise a drive motor and a gearbox. By way of the gearbox, for example a torque generated by the drive motor can be transmissible to at least one drive axle, for example a front and/or rear drive axle, of the utility vehicle.

A hydraulic arrangement according to the disclosure has the advantage that, as a result of the combination of different, required hydraulic branches with a low pressure, advantageously considerable power savings for the utility vehicle can be achieved, since the supply of the different hydraulic components or consumers via the main hydraulic branch, charge hydraulic branch and lubricating hydraulic branch can be realized relatively independently of speed and in accordance with demand. Furthermore, an advantage with regard to costs and development expenses is established, since, with regard to the gearbox lubricating hydraulic branch, all the lines and valve can be designed for a lower lubricant fluid flow that is kept constant.

The above and other features will become apparent from the following detailed description and accompanying drawings.

BRIEF DESCRIPTION OF THE DRAWINGS

In the following text, the disclosure and further advantages and advantageous developments and configurations of the disclosure will be explained in more detail both in terms of equipment and of the method using exemplary embodiments and with reference to the drawings. Components that correspond or are comparable in terms of their function are provided with the same reference signs. In the drawings.

DETAILED DESCRIPTION

The embodiments or implementations disclosed in the above drawings and the following detailed description are not intended to be exhaustive or to limit the present disclosure to these embodiments or implementations.

Figure 1:
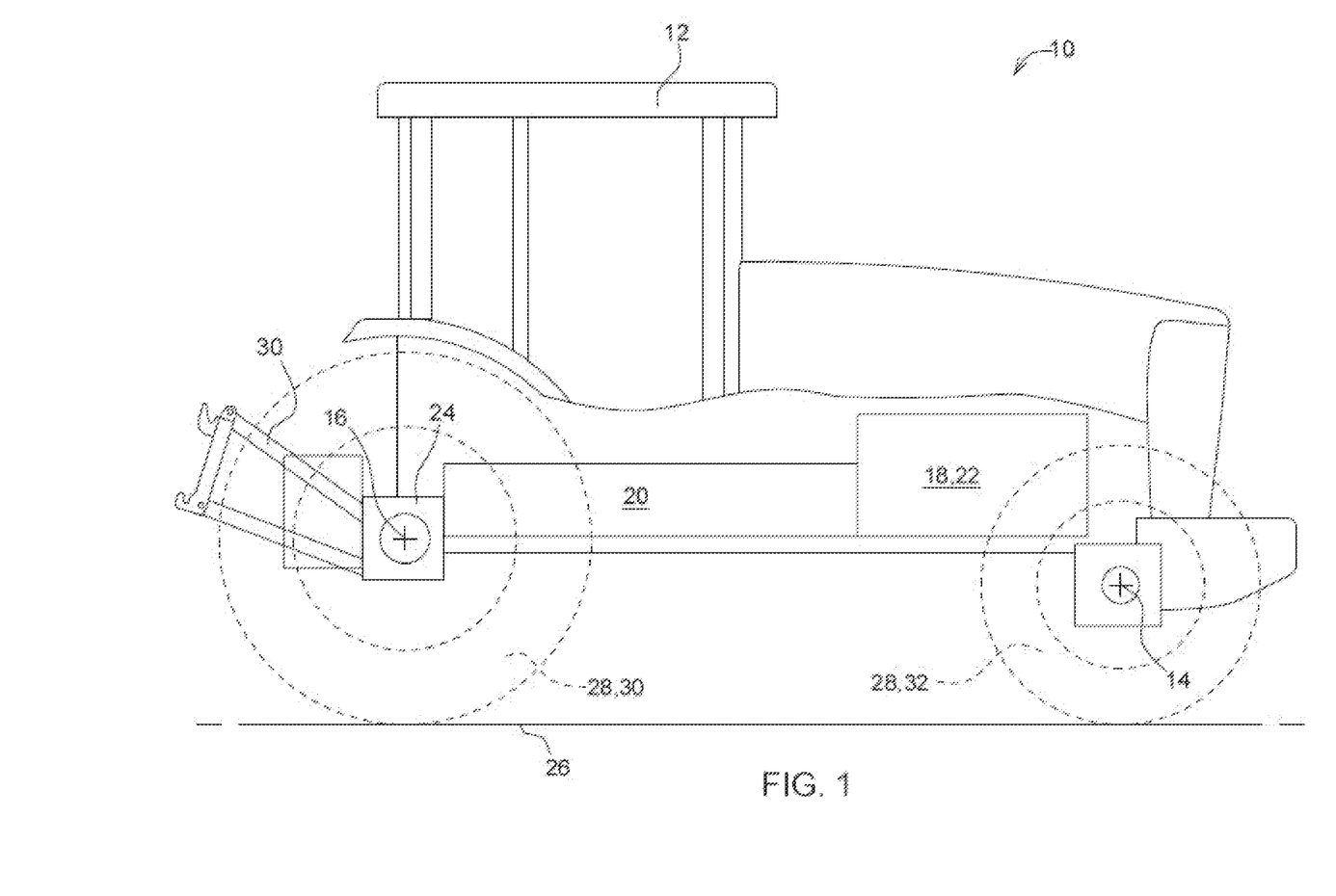
FIG. 1 shows a schematic illustration of a first exemplary embodiment of an agricultural or industrial utility vehicle according to the disclosure having a hydraulic arrangement according to the disclosure.

FIG. 1 shows a schematic illustration of a first exemplary embodiment of an agricultural or industrial utility vehicle 10 according to the disclosure, for example of a tractor, having a hydraulic arrangement 20 according to the disclosure. The utility vehicle 10 comprises a cab 12, a front drive axle 14 and a rear drive axle 16, and a differential 24. The rear drive axle 16 can be permanently driven and the front drive axle 14 can be engageable as required or permanently driven. The utility vehicle 10 also comprises a drive motor 18, which can be embodied as an internal combustion engine or electric motor. The hydraulic arrangement 20 as a structure made up of different individual hydraulic branches.

Using the gearbox 22, a moment of force and torque of the drive motor 18 can be transmissible with different gear ratios to the front and/or rear drive axle 14, 16. The front and/or rear drive axle 14, 16 convert a speed or a torque of the drive motor into a rotation of one or more ground engagement means 28 and thus into propulsion of the utility vehicle. The towing vehicle 10 can have one or more ground engagement means 28, illustrated here in the form of wheels 30, 32, which are engaged with an underlying surface 26 in order to transmit drive forces and/or by way of which the utility vehicle 10 is supported on the underlying surface. The utility vehicle 10 can furthermore have a chassis (not illustrated), wherein the chassis can be supported for example by the wheels 30, 32 mounted on the front and rear drive axles 14, 16.

Figure 2:
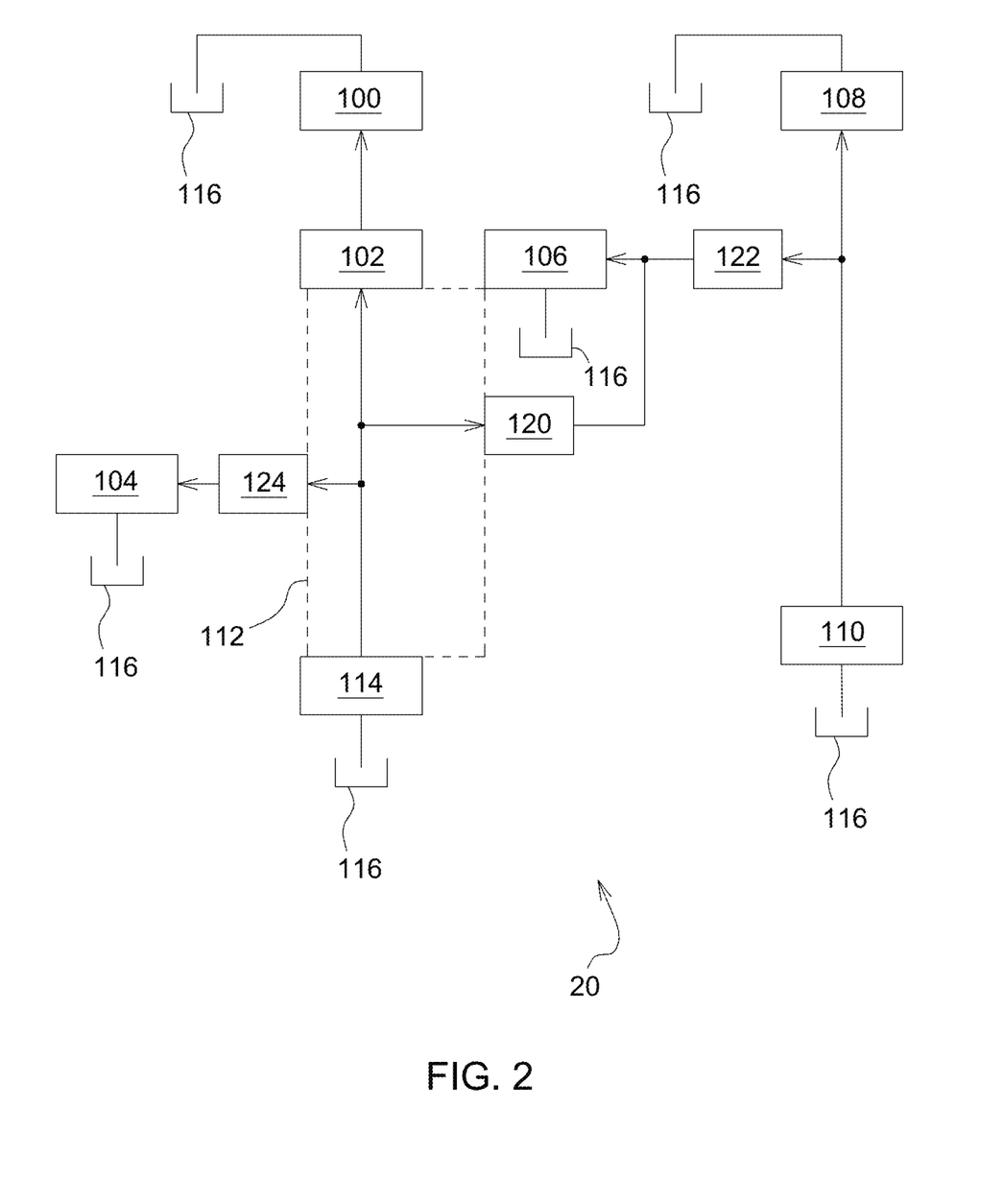
FIG. 2 shows a schematic block diagram of a first exemplary embodiment of a hydraulic arrangement according to the disclosure.

FIG. 2 shows a schematic block diagram of a first exemplary embodiment of a hydraulic arrangement 20 according to the disclosure. The hydraulic arrangement 20 shown in FIG. 2 corresponds substantially to the hydraulic arrangement 20 shown in FIG. 1, and for this reason, only details that are not shown in FIG. 1 and/or differences therefrom will be addressed in the following text. The utility vehicle 10 according to FIG. 1 can comprise the hydraulic arrangement 20 as illustrated in FIG. 2.

The hydraulic arrangement 20 comprises a main hydraulic branch 100, a lubricating hydraulic branch 104, a gearbox lubricating hydraulic branch 106 and a shifting hydraulic branch 108. To supply the main hydraulic circuit 100, the hydraulic arrangement 20 comprises a main hydraulic pump 102, with which hydraulic fluid is able to be fed to the main hydraulic branch 100. The individual hydraulic branches 100, 104, 106, 108 are connected to corresponding return reservoirs or hydraulic tanks 116, into which excess hydraulic fluid is functionally returned or drained. Moreover, the hydraulic arrangement 20 comprises a charge pump 114, and for example a charge hydraulic branch 112, wherein hydraulic fluid is able to be fed to the main hydraulic pump 102 by the charge pump 114, and/or for example the charge hydraulic branch 112. The charge hydraulic branch 112 comprises, in the first exemplary embodiment, the lines from the charge pump 114 to the main hydraulic branch 100 and the lubricating hydraulic branch 104 and for example the gearbox lubricating hydraulic branch 106. At least a part of the hydraulic fluid delivered by the charge pump 114 is able to be fed to the lubricating hydraulic branch 104. Furthermore, at least a part of the hydraulic fluid delivered by the charge pump 114 is able to be fed to the gearbox lubricating hydraulic branch 106. The charge pump 114 can thus pump hydraulic fluid for charging the main hydraulic pump 102 and into the lubricating hydraulic branch 104 and the gearbox lubricating hydraulic branch 106. Furthermore, the charge pump 114 is connected to a hydraulic tank 116. To supply the shifting hydraulic branch 108, the hydraulic arrangement 20 comprises a gearbox pump 110, wherein hydraulic fluid is able to be fed by the gearbox pump 110 to the shifting hydraulic branch 108 in order to shift the gearbox. Furthermore, the gearbox pump 110 is connected to a hydraulic tank 116.

The hydraulic arrangement 20 also, as shown, comprise a first valve unit 120, which has an inlet connected to the charge pump 114, and/or for example to the charge hydraulic branch 112, and an outlet connected to the gearbox lubricating hydraulic branch 106. The first valve unit 120 is thus actuable to control the connection, for example a fluidic connection, between the charge pump 114, and/or for example the charge hydraulic branch 112, and the gearbox lubricating hydraulic branch 106. On account of the coupling of the charge pump 114, and/or for example the charge hydraulic branch 112, to the gearbox lubricating hydraulic branch 106 with or by the first valve unit 120, hydraulic fluid can be fed to the gearbox lubricating hydraulic branch 106 by the charge pump 114, and/or for example by the charge hydraulic branch 112, said hydraulic fluid also ready having the pressure required by the gearbox lubricating hydraulic branch 106, i.e. a charge pressure or a second pressure. As a result, the hydraulic arrangement 20 can be operated more energy efficiently and can be configured in a structurally simple manner. Specifically, the gearbox pump 110 can be designed to be smaller and/or the charge pump 114 can be operated more efficiently. The charge pump 114, and/or for example the charge hydraulic branch 112, and the gearbox lubricating hydraulic branch 106 can be coupled directly, without a first valve unit 120. For example, however, the hydraulic arrangement 200 can comprise the first valve unit 120, such that the gearbox lubricating hydraulic branch 106 can be supplied with hydraulic fluid advantageously as required. The first valve unit 120 can comprise a first pressure regulating valve (see FIGS. 4a, 4b and 4e, reference signs 140, 144, 154). The first valve unit 120 can comprises for example a first pilot valve (see FIG. 4a, reference sign 142) and/or a pressure sensor (see FIGS. 4a and 4e, reference sign 152). The first valve unit 120, for example the first pressure regulating valve, can be in the form of an electrically regulated pilot-controlled first pressure regulating valve 140 (see FIG. 4a). The first valve unit 120, for example the first pressure regulating valve, can, however, also be in the form of a directly electronically controlled first pressure regulating valve (see FIG. 4e, reference sign 154). Likewise, the first valve unit 120, for example the first pressure regulating valve, can, however, also be in the form of a mechanical first pressure regulating valve (see FIG. 4b, reference sign 144). The first valve unit 120 can, however, also comprise a non-return valve without or with spring loading (see FIGS. 4c and 4d, reference signs 146, 148). Furthermore, the hydraulic arrangement 20 can comprise a second valve unit 122, which can be for example in the form of a pressure relief valve or of a simple overpressure valve. The second valve unit 122 can, as shown, have an inlet, which is connected, for example fluidically connected, to the gearbox pump 110, for example via a line. Likewise, the second valve unit 122 can have an outlet, which is connected, for example fluidically connected, to the gearbox lubricating hydraulic branch 106, for example via a line, such that hydraulic fluid can run from the gearbox pump 110 to the gearbox lubricating hydraulic branch 106. A part of the hydraulic fluid can, after the valve unit 122, also be conducted from the gearbox pump 110 via one or more coolers (not shown) into the gearbox lubricating hydraulic branch 106.

The gearbox lubricating hydraulic branch 106 encompasses lubrication of a gearbox and/or of gearbox components with hydraulic fluid. The main hydraulic branch 100 comprises a plurality of hydraulic components, which are supplied by high-pressure hydraulics. These can be for example control valves (not shown) for controlling or operating hydraulic accessory equipment, for example front loaders or hydraulically actuated towed equipment or soil cultivation equipment. Furthermore, these can include a hydraulically actuated hitch (see FIG. 1, reference sign 30), which can be in the form for example of a three-point hitch 30 and can have a plurality of hydraulic actuators, for example hydraulic cylinders, on different links. Furthermore, the main hydraulic branch 100 can supply hydraulic fluid to hydraulic components which are part of a hydraulic axle suspension of a front and/or rear drive axle of the utility vehicle 10 or a hydraulic cab suspension of a cab 12. Furthermore, the main hydraulic branch 100 can serve to supply hydraulic brake system components or hydraulic components that are part of the steering system for steering the utility vehicle.

The lubricating hydraulic branch 104 should be assigned low-pressure hydraulics and can serve for lubricant supply, i.e., for supplying the drive axle 14, 16 of the utility vehicle 10, and/or vehicle axle components and/or a PTO shaft and/or PTO shaft components and/or a differential with hydraulic fluid and/or further lubrication points in the gearbox. The hydraulic arrangement 20 can comprise a second pressure regulating valve 124. The lubricating hydraulic branch 104 can be arranged and connected, for example fluidically connected, to the charge pump 114 and/or the charge hydraulic branch 112 such that hydraulic fluid can flow off or run from the charge pump 114, for example via the charge hydraulic branch, to the second pressure regulating valve 124 and then to the lubricating hydraulic branch 104. The second pressure regulating valve 124 can have an inlet connected to the charge pump 114, and/or for example to the charge hydraulic branch 112, for example via a line, and an outlet connected to the lubricating hydraulic branch 104, for example via a line. The second pressure regulating valve 124 can thus be actuable for controlling the connection, for example a fluidic connection, between the charge pump 114, and/or for example the charge hydraulic branch 112, and the lubricating hydraulic branch 104.

Figure 3:
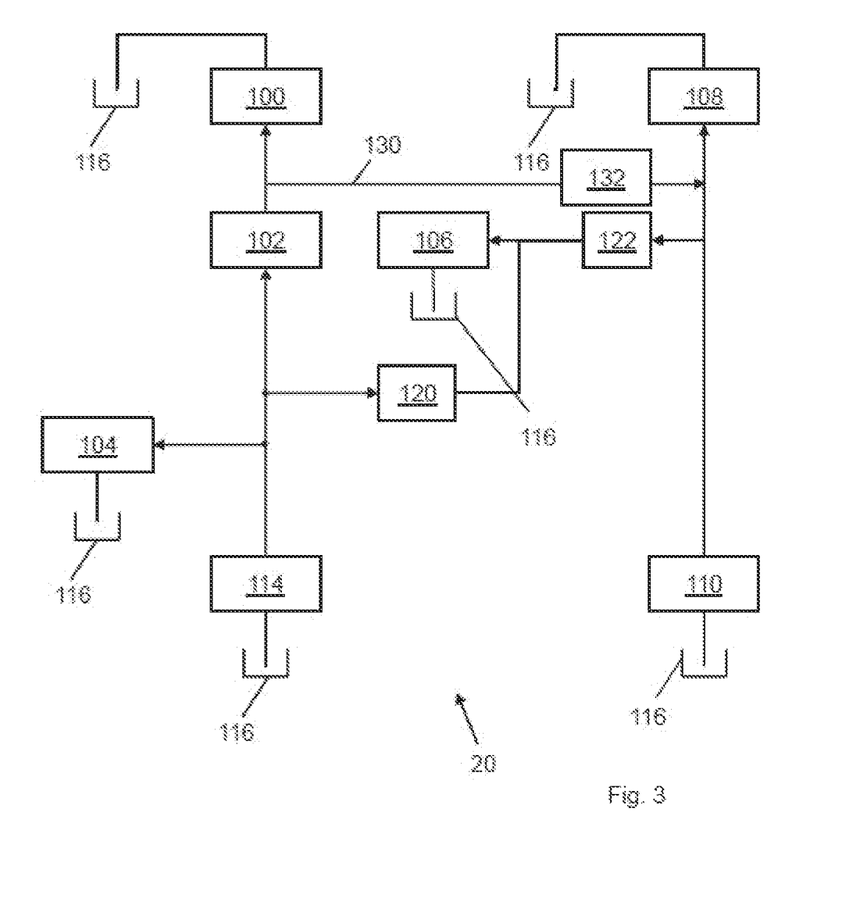
FIG. 3 shows a schematic block diagram of a second exemplary embodiment of a hydraulic arrangement according to the disclosure.

FIG. 3 shows a schematic block diagram of a second exemplary embodiment of a hydraulic arrangement 20 according to the disclosure. The hydraulic arrangement 20 shown in FIG. 3 corresponds substantially to the hydraulic arrangement 20 shown in FIGS. 1 and 2, and so only the details that are not shown in FIGS. 1 and 2 and/or differences therefrom are addressed in the following text. The utility vehicle 10 according to FIG. 1 can comprise the hydraulic arrangement 20 as illustrated in FIG. 3.

The hydraulic arrangement 20 comprises in this case a bypass 130 or diversion. As a result, at least a part of the hydraulic fluid delivered by the main hydraulic pump 102 can be able to be fed to the shifting hydraulic branch 108. Furthermore, the hydraulic arrangement 20 can comprise a third valve unit 132, the inlet of which is connected, for example fluidically connected, to the main hydraulic pump 102, for example via a line, and the outlet of which is connected, for example fluidically connected, to the shifting hydraulic branch 108, for example via a line. The third valve unit 132 can comprise a third pressure regulating valve, which is the same as the first pressure regulating valve (see FIGS. 4a, 4b and 4e, reference signs 140, 144, 154). The third valve unit 132 can comprise for example a third pilot valve and/or a further pressure sensor, the structure of which is the same as the first pilot valve (see FIG. 4a, reference sign 142) and/or the pressure sensor (see FIG. 4a, reference sign 152). The third valve unit 132, for example the third pressure regulating valve, can be in the form of an electrically regulated pilot-controlled third pressure regulating valve. However, the third valve unit 132 can also be a directly electronically controlled third pressure regulating valve, the structure of which is the same as the directly electronically controlled first pressure regulating valve (see FIG. 4e, reference sign 154), or be a mechanical third pressure regulating valve, the structure of which is the same as the mechanical first pressure regulating valve (see FIG. 4b, reference sign 144). As a result, hydraulic fluid can be fed to the gearbox pump 110, with the result that the gearbox pump 110 can be dimensioned in a smaller manner and advantageously power losses can be reduced.

FIGS. 4a to 4e show various embodiments of the first valve units 120 of the hydraulic arrangement 20 according to the disclosure shown in FIGS. 1 to 3 and of the utility vehicle 10 according to the disclosure. The hydraulic arrangement 20 and the utility vehicle according to FIGS. 1 to 3 can comprise the first valve units 120 shown in FIGS. 4a to 4e.

Figure 4A:
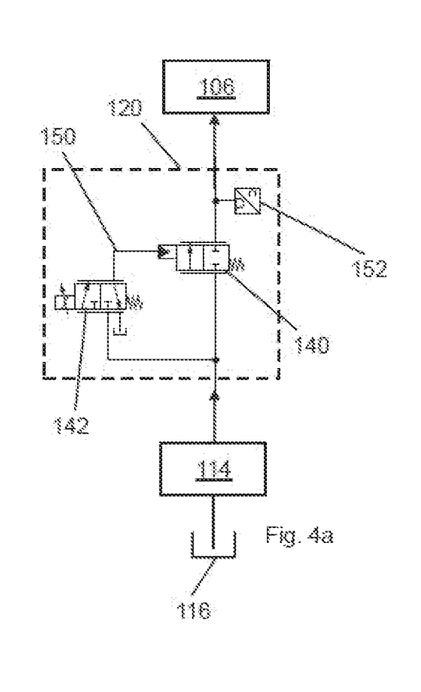
FIGS. 4a to 4e show schematic illustrations of different embodiments of the first valve units of the hydraulic arrangement according to the disclosure.

FIG. 4a shows a first embodiment of the first valve unit 120. The first valve unit 120, for example the first pressure regulating valve, is in the form of an electrically regulated pilot-controlled first pressure regulating valve 140. The electrically regulated pilot-controlled first pressure regulating valve 140 is in the form of a spring-loaded pressure-actuated 2/2-way valve. Furthermore, the first valve unit 120 comprises a first pilot valve 142, which is in the form of an electrically actuated 3/2-way valve. The charge pump 114, and/or for example the charge hydraulic branch 112, is connected to an inlet of the first pressure regulating valve 140, for example via a line. As a result, the charge pump 114, and/or for example the charge hydraulic branch 112, is fluidically connected to the first pressure regulating valve 140. The gearbox lubricating hydraulic branch 106 is connected to an outlet of the first pressure regulating valve 140, for example via a further line. As a result, the gearbox lubricating hydraulic branch 106 is fluidically connected to the first pressure regulating valve 140. A further line connects the first inlet of the first pilot valve 142 to the charge pump 114, and/or for example to the charge hydraulic branch 112. As a result, the charge pump 114 is fluidically connected to the first pilot valve 142. A second inlet of the first pilot valve 142 can be connected, for example fluidically connected, to a hydraulic tank. A first control line 150 connects the outlet of the first pilot valve 142 to the first pressure regulating valve 140. As a result, the first pressure regulating valve 140 is fluidically connected to the first pilot valve 142. Furthermore, the first valve unit 120 can, as shown, comprise a pressure sensor 152. The pressure sensor can be used for pressure regulation and/or serves for checking the valve function of the first valve unit 120, for example of the first pressure regulating valve 140 and/or of the first pilot valve 142. In the first control line 150, a throttle or a throttle valve can be arranged. Likewise, the first pilot valve 142 can be electrically actuable. The first pressure regulating valve 140 can be pressure-actuated by the first pilot valve 142.

Figure 4B:
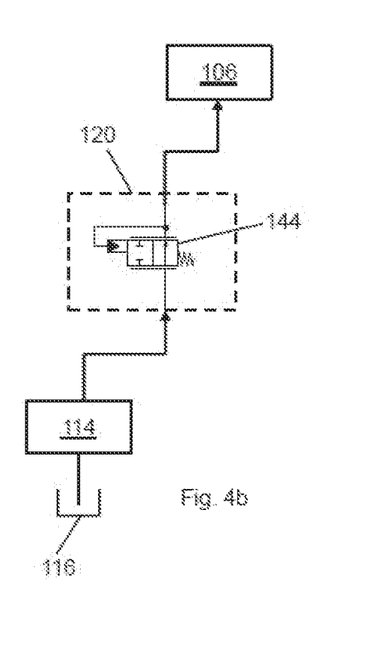

FIG. 4b shows a further embodiment of the first valve unit 120. The arrangement shown in FIG. 4b, with the further embodiment of the first valve unit, corresponds substantially to the hydraulic arrangement 20 shown in FIGS. 1 to 3 and 4a, and so only the details that are not shown and/or differences are addressed in the following text. The first valve unit 120 comprises a mechanical first pressure regulating valve 144, which is for example in the form of a spring-loaded, pressure-actuated 2/2-way valve. A line connects the charge pump 114, and/or for example the charge hydraulic branch 112, to an inlet of the mechanical first pressure regulating valve 144. As a result, the charge pump 114, and/or for example the charge hydraulic branch 112, is fluidically connected to the mechanical first pressure regulating valve 144. A further line connects an outlet of the mechanical first pressure regulating valve 144 to the gearbox lubricating hydraulic branch 106. As a result, the gearbox lubricating hydraulic branch 106 is fluidically connected to the mechanical first pressure regulating valve 144.

Figure 4C:
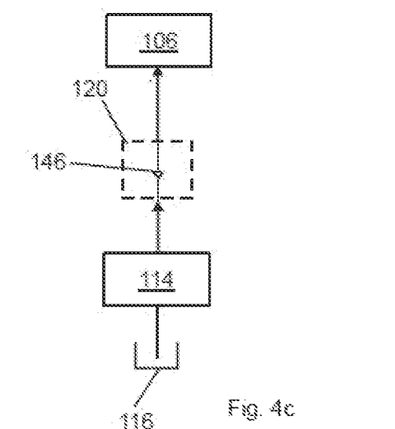
Figure 4D:
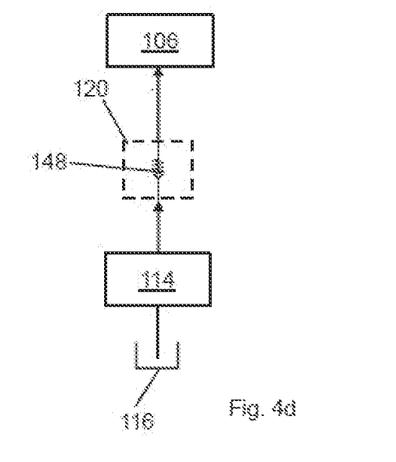

FIGS. 4c and 4d show further embodiments of the first valve unit 120. The arrangements shown in FIGS. 4c and 4d, with the further embodiments of the first valve unit 120, correspond substantially to the hydraulic arrangements 20 shown in FIGS. 1 to 3 and 4a and 4b, and so only the details that are not shown and/or differences are addressed in the following text. FIG. 4c shows the first valve unit 120, which comprises a non-return valve 146. FIG. 4d shows the first valve unit 120, which comprises a spring-loaded non-return valve 148. In the two exemplary embodiments shown in FIGS. 4c and 4d, a line connects the charge pump 114, and/or for example the charge hydraulic branch 112, to an inlet of the non-return valve 146 or of the spring-loaded non-return valve 148. As a result, the charge pump 114, and/or for example the charge hydraulic branch 112, is fluidically connected to the non-return valve 146 or to the spring-loaded non-return valve 148. A further line connects an outlet of the non-return valve 146 or of the spring-loaded non-return valve 148 to the gearbox lubricating hydraulic branch 106. As a result, the gearbox lubricating hydraulic branch 106 is fluidically connected to the non-return valve 146 or to the spring-loaded non-return valve 148.

Figure 4E:
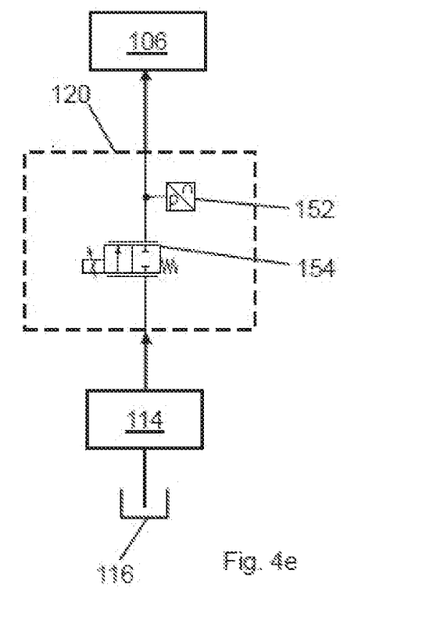

FIG. 4e shows a further embodiment of the first valve unit 120. The arrangement shown in FIG. 4e, with the further embodiment of the first valve unit, corresponds substantially to the hydraulic arrangement 20 shown in FIGS. 1 to 3 and 4a to 4d, and so only the details that are not shown and/or differences are addressed in the following text. The first valve unit 120 comprises a directly electrically controlled first pressure regulating valve 154, which is in the form of a spring-loaded and electrically controlled 2/2-way valve. The charge pump 114, and/or for example the charge hydraulic branch 112, is connected to an inlet of the directly electrically controlled first pressure regulating valve 154, for example via a line. As a result, the charge pump 114, and/or for example the charge hydraulic branch 112, is fluidically connected to the first pressure regulating valve 154. The gearbox lubricating hydraulic branch 106 is connected to an outlet of the first pressure regulating valve 154, for example via a further line. As a result, the gearbox lubricating hydraulic branch 106 is fluidically connected to the first pressure regulating valve 154. Furthermore, the first valve unit 120 comprises the pressure sensor 152 for the pressure regulation of the first valve unit 120, for example of the first pressure regulating valve 154.

The terminology used herein is for the purpose of describing example embodiments or implementations and is not intended to be limiting of the disclosure. As used herein, the singular forms "a," "an," and "the" are intended to include the plural forms as well, unless the context clearly indicates otherwise. It will be further understood that the any use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof.

Those having ordinary skill in the art will recognize that terms such as "above," "below," "upward," "downward," "top," "bottom," etc., are used descriptively for the figures, and do not represent limitations on the scope of the present disclosure, as defined by the appended claims. Furthermore, the teachings may be described herein in terms of functional and/or logical block components or various processing steps, which may include any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described embodiments or implementations.

As used herein, "e.g.," is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example embodiments or implementations of the present disclosure, these descriptions should not be viewed in a restrictive or limiting sense. Rather, there are several variations and modifications which may be made without departing from the scope of the appended claims.

What is claimed is:

1. A hydraulic arrangement for an agricultural or industrial utility vehicle, comprising:
   a main hydraulic circuit and a main hydraulic pump, wherein hydraulic fluid can be fed to the main hydraulic circuit by the main hydraulic pump;
   a charge pump, wherein hydraulic fluid can be fed to the main hydraulic pump by the charge pump;
   a lubricating hydraulic circuit and a gearbox lubricating hydraulic circuit, wherein at least a part of the hydraulic fluid delivered by the charge pump can be fed to the lubricating hydraulic circuit;
   a shifting hydraulic circuit for shifting a gearbox; and
   a gearbox pump, wherein hydraulic fluid can be fed to the shifting hydraulic circuit by the gearbox pump;
   wherein at least a portion of the hydraulic fluid delivered by the charge pump can be fed to the gearbox lubricating hydraulic circuit; and
   wherein at least a portion of the hydraulic fluid delivered by the main hydraulic pump can be fed to the shifting hydraulic circuit.

2. The hydraulic arrangement of claim 1, further comprising:
   a first valve unit which has an inlet connected to the charge pump and an outlet connected to the gearbox lubricating hydraulic circuit, wherein the first valve unit is actuable to control the connection between the charge pump and the gearbox lubricating hydraulic circuit.

3. The hydraulic arrangement of claim 2, wherein the first valve unit includes a first pressure regulating valve.

4. The hydraulic arrangement of claim 3, wherein the first pressure regulating valve is a first pilot valve.

5. The hydraulic arrangement of claim 2, further comprising:
   a second valve unit which has an inlet connected to the gearbox pump and an outlet connected to the gearbox lubricating hydraulic circuit, wherein the second valve unit is actuable to control the connection between the gearbox pump and the gearbox lubricating hydraulic circuit.

6. The hydraulic arrangement of claim 1, wherein the gearbox lubricating hydraulic circuit includes lubrication of a gearbox with hydraulic fluid.

7. The hydraulic arrangement of claim 1, wherein the lubricating hydraulic circuit includes lubrication of a drive axle of the vehicle with hydraulic fluid.

8. The hydraulic arrangement of claim 1, wherein the lubricating hydraulic circuit includes lubrication of a vehicle axle component with hydraulic fluid.

9. The hydraulic arrangement of claim 1, wherein the lubricating hydraulic circuit includes lubrication of a PTO shaft with hydraulic fluid.

10. The hydraulic arrangement of claim 1, wherein the lubricating hydraulic circuit includes lubrication of a differential with hydraulic fluid.

11. The hydraulic arrangement of claim 1, wherein the main hydraulic circuit includes supplying control valves with hydraulic fluid.

12. The hydraulic arrangement of claim 1, wherein the main hydraulic circuit includes supplying an axle suspension for a drive axle of the vehicle with hydraulic fluid.

13. The hydraulic arrangement of claim 1, wherein the main hydraulic circuit includes supplying a cab suspension for a cab of the vehicle with hydraulic fluid.

14. The hydraulic arrangement of claim 1, wherein the main hydraulic circuit includes supplying a brake system for brakes on the vehicle with hydraulic fluid.

15. The hydraulic arrangement of claim 1, wherein the main hydraulic circuit includes supplying a steering system for steering the utility vehicle with hydraulic fluid.

16. An agricultural or industrial utility vehicle comprising the hydraulic arrangement of claim 1.

17. A hydraulic arrangement for an agricultural or industrial utility vehicle, comprising:

a main hydraulic circuit and a main hydraulic pump, wherein hydraulic fluid can be fed to the main hydraulic circuit by the main hydraulic pump;

a charge pump, wherein hydraulic fluid can be fed to the main hydraulic pump by the charge pump;

a lubricating hydraulic circuit and a gearbox lubricating hydraulic circuit, wherein at least a part of the hydraulic fluid delivered by the charge pump can be fed to the lubricating hydraulic circuit;

a shifting hydraulic circuit for shifting a gearbox;

a gearbox pump, wherein hydraulic fluid can be fed to the shifting hydraulic circuit by the gearbox pump;

a first valve unit which has an inlet connected to the charge pump and an outlet connected to the gearbox lubricating hydraulic circuit, wherein the first valve unit is actuable to control the connection between the charge pump and the gearbox lubricating hydraulic circuit; and a second valve unit which has an inlet connected to the gearbox pump and an outlet connected to the gearbox lubricating hydraulic circuit, wherein the second valve unit is actuable to control the connection between the gearbox pump and the gearbox lubricating hydraulic circuit.

18. The hydraulic arrangement of claim 17, wherein the first valve unit includes a first pressure regulating valve and the second valve unit includes a second pressure regulating valve.

19. The hydraulic arrangement of claim 18, wherein at least one of the first pressure regulating valve or the second pressure regulating valve is electronically controlled.

20. The hydraulic arrangement of claim 18, wherein at least one of the first pressure regulating valve or the second pressure regulating valve includes a pressure sensor.

\* \* \* \* \*